(12) United States Patent
Gardner

(10) Patent No.: US 7,246,213 B2
(45) Date of Patent: Jul. 17, 2007

(54) DATA ADDRESS SECURITY DEVICE AND METHOD

(75) Inventor: Robert D. Gardner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 295 days.

(21) Appl. No.: 10/902,406

(22) Filed: Jul. 28, 2004

(65) Prior Publication Data

US 2006/0136634 A1    Jun. 22, 2006

(51) Int. Cl.
*G06N 5/00* (2006.01)
(52) U.S. Cl. .................... 711/163; 708/250; 375/224
(58) Field of Classification Search ............. 711/163; 370/328, 232; 710/100; 708/250; 375/224
See application file for complete search history.

(56) References Cited

U.S. PATENT DOCUMENTS

| | | | |
|---|---|---|---|
| 4,365,294 A * | 12/1982 | Stokken | 713/502 |
| 5,963,543 A * | 10/1999 | Rostoker et al. | 370/232 |
| 6,278,729 B1 * | 8/2001 | Thompson | 375/224 |
| 6,282,239 B1 * | 8/2001 | Thompson | 375/224 |
| 6,671,758 B1 * | 12/2003 | Cam et al. | 710/100 |
| 6,751,205 B2 * | 6/2004 | Menon et al. | 370/328 |
| 7,165,084 B2 * | 1/2007 | Crispin et al. | 708/250 |

* cited by examiner

*Primary Examiner*—Wilbert L. Starks, Jr.
(74) *Attorney, Agent, or Firm*—Richard P. Lange

(57) ABSTRACT

Methods and devices for monitoring transactions on a bus are disclosed herein. An embodiment of the device comprises a memory component and a comparator component. The memory component stores at least one address. The comparator component is operatively connected to the memory component and the bus. The comparator component compares an address transmitted over the bus with the stored address for purposes of identifying impermissible addresses. The device causes a transaction associated with an impermissible address to be aborted.

22 Claims, 6 Drawing Sheets

DATA ADDRESS SECURITY DEVICE AND METHOD

BACKGROUND

The invention of multiprogramming has led to higher demands for protection and sharing between programs. Multiprogramming also led to the concept of a process, that is, a running program plus any state needed to continue running the program. For a process to operate correctly whether it executes continuously from start to finish or is interrupted repeatedly and switched with other processes, there is needed some protection mechanism so that one process cannot modify another process or alter state information stored in memory.

Some processor architectures provide different protection mechanisms to maintain memory integrity between processes. For example, the IA-32 architecture provides three protection mechanisms: protection levels; descriptors, and address mapping (linear and virtual addresses translated to physical addresses). If these mechanisms are properly utilized, stray memory accesses or other such reckless behavior by one process will interrupt the processor before damage is done, provided the process is executed on the processor.

However, host processors are not the only devices in a computer system that may generate an address (memory or I/O) and potentially corrupt data, programs or I/O devices. Demands on the capacities of processors have caused system designers to develop ways to offload certain tasks (such as moving blocks of data) to I/O processors, offload engines, direct memory access (DMA) devices or other bus masters (hereinafter bus masters), which may generate memory or I/O addresses.

In the operation of modem buses, master/slave or master/target is one model for a communication protocol in which one device or process (known as the master) controls one or more other devices or processes (known as slaves). Once the master/slave relationship is established, the direction of control is generally from the master to the slave(s) (i.e. transactions are initiated by the master).

These bus masters are typically programmed by software device drivers. Once the bus master is programmed, the bus master may access system memory without consulting the processor, thereby bypassing the protection mechanisms of the processor. Thus, a malicious or unbehaved driver could potentially cause a bus master to corrupt data, programs, or the configuration of other bus masters. Such concerns are of particular importance when computer systems handle sensitive data or are connected to public networks.

SUMMARY

Methods and devices for monitoring transactions on a bus are disclosed herein. An embodiment of the device comprises a memory component and a comparator component. The memory component stores at least one address. The comparator component is operatively connected to the memory component and the bus. The comparator component compares an address transmitted over the bus with the stored address for purposes of identifying impermissible addresses. The device causes a transaction associated with an impermissible address to be aborted.

BRIEF DESCRIPTION OF THE DRAWINGS

The following drawings form part of the present specification and are included to further demonstrate certain aspects of the present invention in a nonlimiting fashion. The invention may be better understood by reference to one or more of these drawings in combination with the detailed description of specific embodiments presented herein.

DETAILED DESCRIPTION

In summary and according to one embodiment of the devices and methods described herein, a bus monitoring device is coupled to a bus of a computer system. The bus monitoring device is configured to monitor the bus for impermissible bus transactions, i.e., addresses. If an impermissible address is discovered, the monitoring device causes the bus transaction to terminate before damage, such as corruption of data, can be done.

Figure 1:
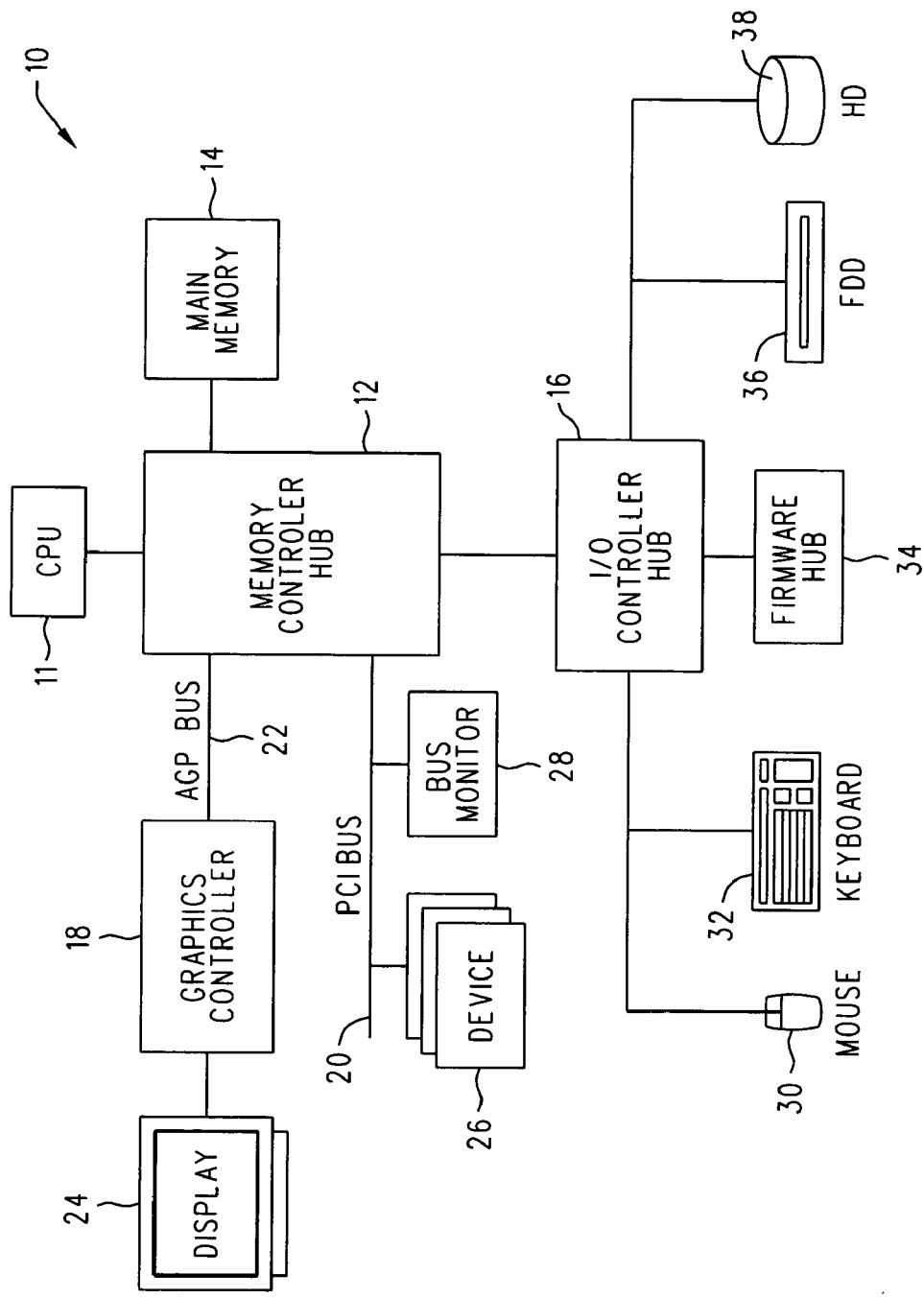
FIG. 1 is a block diagram of an embodiment of a computer system.

Referring to FIG. 1, there is illustrated a computer system 10 according to one embodiment of the methods and systems described herein. The embodiment of FIG. 1 is not intended to imply any architectural limitations to the system and methods described herein.

In embodiment of FIG. 1, a central processing unit (CPU) 11 is coupled to a memory controller hub 12. The memory controller hub 12 is further coupled to a main memory 14, an input/output (I/O) controller hub 16, and a graphics controller 18. The memory controller hub 12 also provides an interface to a first bus 20, for example a peripheral component interface (PCI) bus. The graphics controller 18 is connected to the memory controller hub 12 by a second bus 22, for example an accelerated graphics port (AGP) bus. The output of the graphics controller 18 is provided to a display output device 24 for displaying information such as, two dimensional and three dimensional graphics, text and video.

The main memory 14 may also be configured as a master or slave by way of the memory controller hub 12. The first bus 20 is further connected to one or more I/O devices 26 and a bus monitoring device 28. Certain I/O devices 26 may be configured as bus masters to control and communicate with other I/O devices 26 configured as slaves. The bus monitoring device 28 is operable to monitor the first bus 20 for impermissible transactions. In another embodiment, the bus monitoring device 28 could be connected to additional buses or other buses, such as the second bus 22.

The input/output controller hub 16, may be further connected to a pointing device 30, a keyboard 32, a firmware hub 34, a floppy disk drive (FDD) 36, and a hard disk drive (HDD) 38.

Individual components within the computer system 10 are typically connected to one another via some form of bus, such as the PCI bus 20. In summary, a bus is the channel or path used to transfer data between the components in the computer system 10. There are many different types of parallel and serial buses that are too numerous to mention. The present invention is operable on any kind of bus that transmits an address, such as a memory address.

Figure 2:
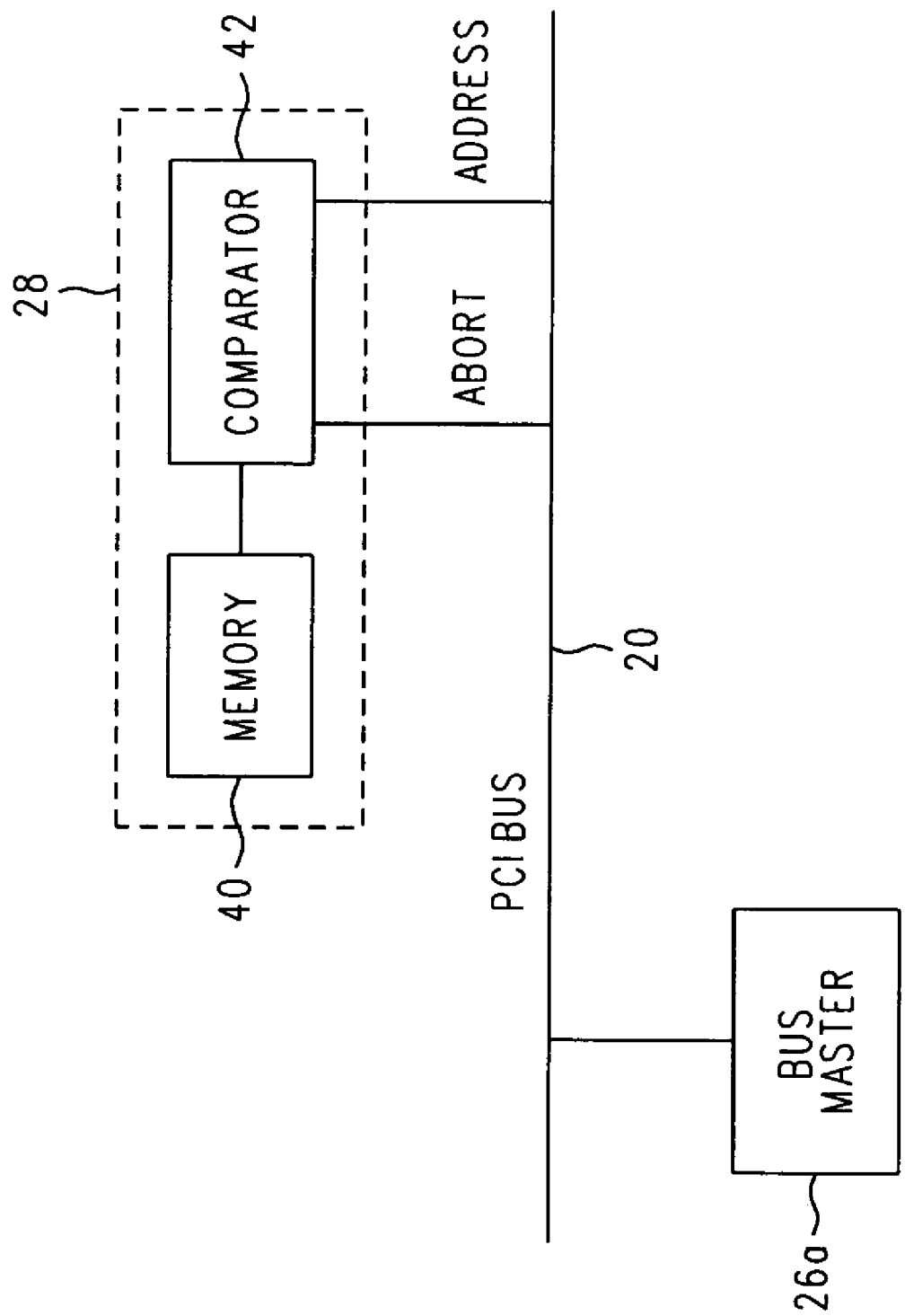
FIG. 2 is a block diagram of the bus monitoring device of FIG. 1 according to one embodiment.

Referring to FIG. 2, there is illustrated a block diagram of the monitoring device 28 according to one embodiment. The monitoring device 28 includes a memory component 40 and a comparator component 42. The memory component 40 is operable to store at least one address of the type that are transmitted by way of the bus 20. In one embodiment of the monitoring device 26, the stored addresses are permissible addresses and all other addresses are impermissible. In other words, the stored addresses correspond to memory addresses that may be accessed. In another embodiment the stored addresses are impermissible addresses and all other addresses are permissible. In other words, the stored addresses correspond to memory addresses that may not be accessed. In either embodiment, the comparator component 42 compares the bus address generated by a bus master 26a with the stored addresses to determine if the bus master transaction is permissible. If the bus address is not permissible, the bus transaction is aborted, halted, or otherwise shut down before the transaction is completed (hereinafter aborted).

The addresses stored in the memory component 40 may be in the form of a range of addresses. In one such embodiment, the range of addresses includes only certain upper order address bits. In an alternative embodiment, the monitoring device 28 could be integral to the memory controller hub 12. In a further variation, the memory component 40 could be formed from a portion of main memory 14.

Having described some embodiments of the computer system 10 and the monitoring device 28, other embodiments will now be described.

Figure 3:
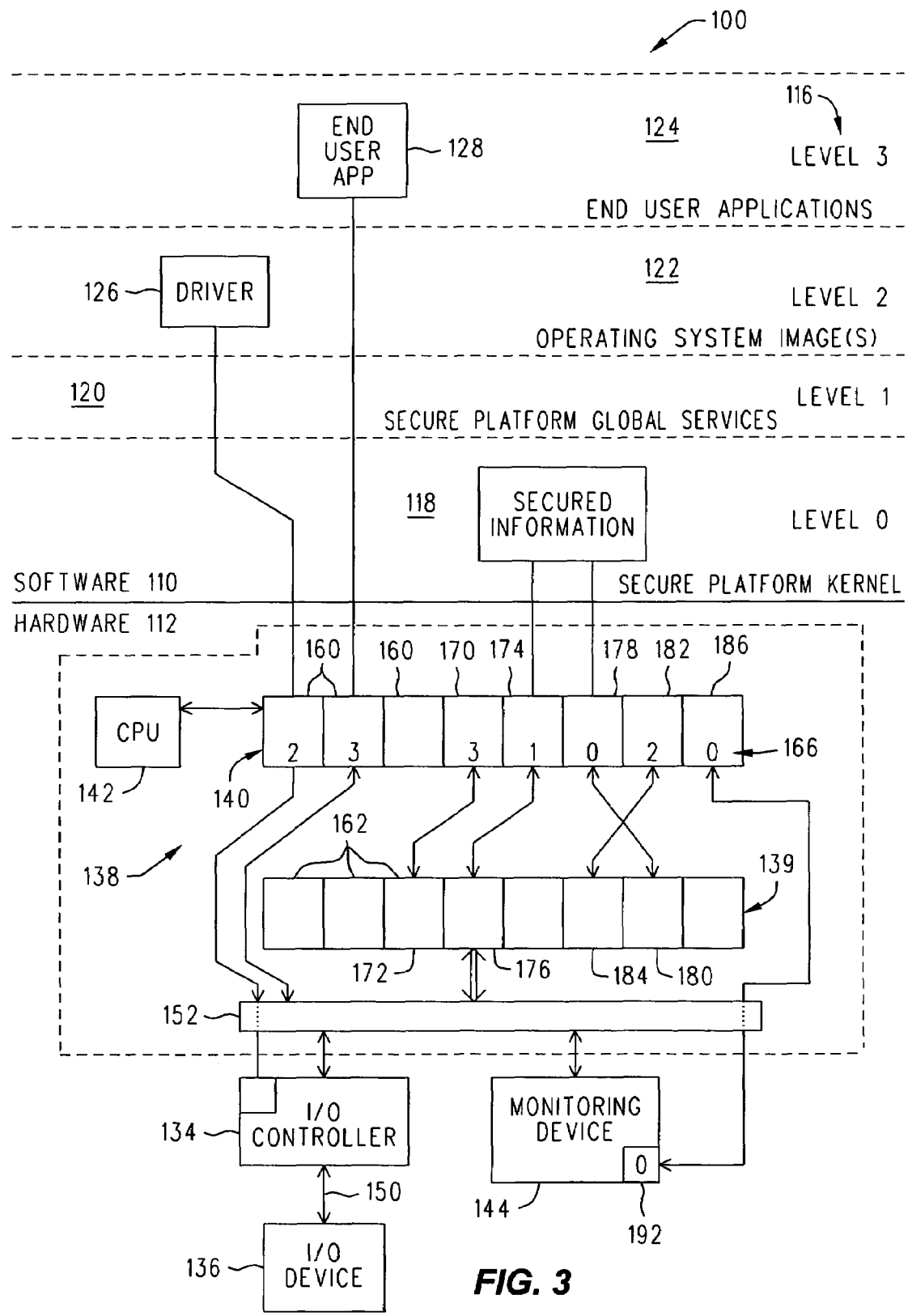
FIG. 3 is a schematic illustration of a computer system according to another embodiment of the present invention.

A schematic illustration of a non-limiting embodiment of another computer system 100 is illustrated in FIG. 3. For illustration purposes, the computer system 100 described herein is divided into a software section 110 and a hardware section 112. The software section 110, in turn, is divided into a plurality of operating or execution privilege levels 116, referred to herein simply as privilege levels 116. The non-limiting embodiment of the computer system 100 described herein has four privilege levels 116 that are described in greater detail below. It is to be understood that the use of four privilege levels 116 is for illustration purposes only and that the computer system 100 may have virtually any number of privilege levels 116.

As is described in greater detail below, the privilege levels 116 serve to assure that only specific code running in the software section 110 of the computer system 100 is able to access only specific memory pages. The terms code and program are used herein include, but are not limited to, kernels, operating systems, applications, and other machine instructions that control the operation of a computer. The four privilege levels 116 are, in the example provided herein, occupied by a secure platform kernel 118, a secure platform global services 120, an operating system image(s) 122, and end user applications 124. The secure platform kernel 118 is sometimes referred to as privilege level zero, or as a virtual machine monitor or hypervisor. The secure platform global services 120 is sometimes referred to as privilege level one, the operating system image(s) 122 is sometime referred to as privilege level two, and the end user applications 124 is sometimes referred to as privilege level three.

It should be noted that the secure platform kernel 118 or privilege level zero provides the most privileged level of security in the computer system 100. Likewise, the end user applications 125 or privilege level three provides the least privileged level of security in the computer system 100. The privilege levels therebetween provide intermediate privilege levels of security.

As described in greater detail below, the secure platform kernel 118 is a portion of the software section 110 that has access to privilege level zero memory addresses by way of a privilege level zero memory mapping. Accordingly, code running in the secure platform kernel 118 has access to data stored in privilege level zero memory addresses. The data accessible to code running in the secure platform kernel 118 is typically sensitive or confidential data. For example, code running in the secure platform kernel 118 may be able to access encryption keys and the like that are used to decipher encrypted data, such as credit card or other personal information. As described in greater detail below, code operating in the secure platform kernel 118 may be the only code having access to privilege level zero memory mappings. Accordingly, the data is kept secure by limiting the code and thus, the users, having access to the data stored in privilege level zero memory mappings. It should be noted that code running on the secure platform kernel 118 typically has access to all of the memory locations.

Code running in the secure platform kernel 118 or at privilege level zero may be granted access to memory locations associated with the secure platform kernel 118. In one embodiment, code running in the secure platform kernel 118 has access to all memory locations. In order to provide security, code running in privilege levels one, two, and three do not have access to the memory locations that the code running in the secure platform kernel 118 has. Code running in secure platform global services 120 typically has access to memory locations associated with privilege levels one, two, and three. Code, such as operating systems, running in the operating system image(s) 122 typically have access to memory locations associated with privilege levels two and three. Applications running in the end user applications 124 typically have access solely to memory locations associated with the third privilege level.

For illustration purposes, a secured information kernel 125 is shown running in the secure platform kernel 118. The secured information kernel 125 may, as an example, be a kernel or other code that has access to secure memory locations, such as a program that deciphers encrypted data. A driver 126 is shown running in the operating system images 122. The driver 122 may, as an example, be a driver associated with an operating system that enables the operating system to transfer data to and from a hardware device, such as an input/output device as described below. As shown in FIG. 3, the driver 126 may be operatively associated with or otherwise connected to an input/output device as is also described in greater detail below. For example, the driver 126 may have the ability to communicate with or program an input/output device. An end user application 128 is shown operating in the end user applications 124. The end user application 128 may, as an example, be a code that has access to unsecured memory locations. The end user applications 124 may need to have the secured information kernel 125 decipher secure data when the need arises to process secure data because the end user applications 124 does not have access to secured memory locations that store this data.

The hardware section 112 of the computer system 100 contains hardware that functions in conjunction with the multiple privilege levels 116 of the software section 110. It should be noted that only the hardware components required to describe and enable the inventive concepts described herein are illustrated in FIG. 3. The hardware section 112 may have an input/output (I/O) controller 134, an I/O device 136, a memory device 138, and a central processing unit (CPU) 142. For illustration purposes, the memory device 138 described herein has two components, memory pages 139 and a memory management unit 140 (MMU). In addition, the hardware portion 112 of the computer system 100 described herein has a monitoring device 144 located therein, which is described in greater detail below. It should be noted that the hardware components described herein may be combined into one or more electronic components.

As described in greater detail below, the I/O controller 134 is configured or otherwise adapted to operate with a specific I/O device 136. The I/O controller 134 is operatively connected to the I/O device 136 by way of a data line 150. The term "data line" is used herein to encompass different methods of transferring data. These methods include, but are not limited to, physical conductors arranged in serial and parallel configurations, optical transceivers, and radio frequency transceivers. An I/O bus 152 electrically connects the I/O controller 134 to the memory device 138. The I/O bus 152 and its associated components may, as a non-limiting example, be configured as a conventional peripheral component interconnect (PCI) bus having a plurality of data lines associated therewith. It should be noted that several I/O devices, not shown, may be operatively connected to the I/O bus 152. As is also shown in FIG. 3, the driver 126 of the software section 110 may communicate with the I/O controller 134. For example, the driver 126 may communicate with and program the I/O controller via standard protocols. It should also be noted that the I/O bus 152 described herein is for illustration purposes and that other I/O buses may be used herein. For example, a serial I/O bus may be used in place of the parallel I/O bus described herein.

The I/O bus 152 may have a plurality of data lines associated therewith. The data lines may serve to transmit memory addresses in addition to data and other information used in data transfer protocols to devices operatively associated with or connected to the I/O bus 152. The I/O bus 152 provides for the transfer of data between the memory device 138 and other devices within the computer system 100, including the I/O device 136. In summary, data is transferred in a conventional manner by providing an address and data on the data lines. The address information determines the location within the memory device 138 from where data is originating or where data is to be directed. The data is transmitted either from a device to a memory location or from a memory location to a device.

As briefly described above, the memory device 138 is described herein as having two components, memory pages 139 and an MMU 140. It is to be noted that the memory device 138 described herein is for illustration purposes and that the memory device 138 may have other components associated therewith. It should be noted that the functions of the MMU 140 may actually be incorporated into the CPU 142. Memory allocation within the memory device 138 is managed by the MMU 140 and mapped to the memory pages 139. More specifically, the MMU 140 is shown as having a plurality of memory units 160 that are mapped to corresponding pages 139, wherein the pages 139 are representative of portions of the memory that physically store data. The memory units 160 may be assigned privilege levels 166 by the MMU 140. More specifically, each of the memory units 160 may be assigned one of a plurality of privilege levels 166, which correspond to the privilege levels 116 previously described with reference to the privilege levels 116 in the software section 110. The privilege levels 166 are used to determine which code within the software section 110 of the computer system 100 has access to specific portions of memory. More specifically, the privilege levels 166 are used to determine which code may access specific memory pages 139. Accordingly, as described in greater detail below, the use of the privilege levels 166 may serve to prevent unauthorized code from accessing secured memory locations and, thus, secured data.

In the embodiment of the computer system 100 described herein, applications and other programs running in privilege level three (the end user applications 124) have access solely to memory pages 139 assigned to the third privilege level by the MMU 140. These memory pages 139 are referenced with the number "3" (i.e., 172) in the memory pages 139 and the MMU 140. Applications running in privilege level three have no access to any other memory pages. Code running in privilege level two (the operating system image(s) 122) has access to memory pages 139 assigned to the second or the third privilege levels by the MMU 140. These memory pages 139 referenced with either "2" or "3" (i.e., 172, 184) in the memory pages 139 and the MMU 140. Code running in privilege level one (the secure platform global services 120) have access to memory pages 139 assigned to the first, second, or third privilege levels by the MMU 140. These memory pages 139 are referenced with either "1," "2," or "3" (i.e., 172, 184, 176) in the memory pages 139 and the MMU 140. Code running in the privilege level zero of the secure platform kernel 118 may have access to all the memory pages 139 (i.e., 172, 184, 176, 180). It should be noted that only the code running in privilege level zero have access to memory pages 139 assigned to the zero privilege level by the MMU 140.

Examples of privilege levels 166 assigned to memory pages 139 via the MMU 140 are shown in FIG. 3. A first mapping unit 170 has assigned a privilege level three to a first memory page 172. A second mapping unit 174 has assigned a privilege level one to a second memory page 176. A third mapping unit 178 has assigned a privilege level zero to a third memory page 180. A fourth mapping unit 182 has assigned a privilege level two to a fourth memory page 184. As will be described in greater detail below, a fifth mapping unit 186 has assigned a privilege level zero to a memory portion 192 of the monitoring device 144. As described in greater detail below, this assignment is to assure that only code operating in the secure platform kernel 118 is able to determine the memory addresses that are to be acted upon by the monitoring device 144.

Figure 4:
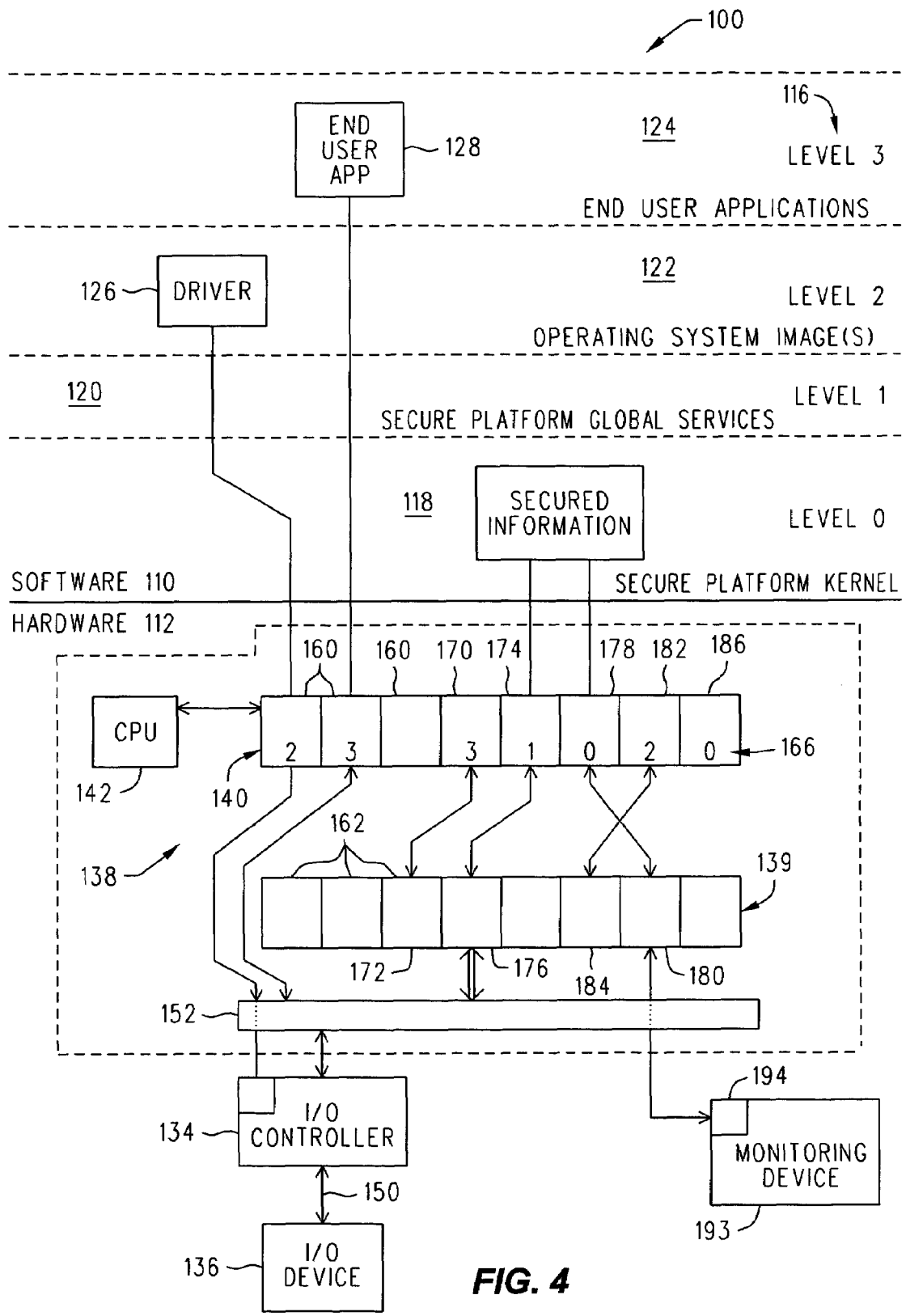
FIG. 4 is a schematic illustration of a computer system according to another embodiment of the present invention.

Another embodiment of the computer system 100 is shown in FIG. 4, wherein a different embodiment of the monitoring device is used. In the computer system 100 of FIG. 4 a monitoring device 193 includes a system level address 194 that points to a memory page 180 in the physical memory 139. As shown in FIG. 4, the memory page 180 is accessible to the monitoring device 193 via DMA.

The computer system 100 described up to this point is similar to a computer system described in the patent application Ser. No. 60/297,175 of Worley, for SECURE PLATFORM ARCHITECTURE filed on Jun. 8, 2001, which is hereby incorporated by reference for all that is disclosed therein. The operation of the computer system 100 as described up this point will be described followed by a description of the computer system 100 with the monitoring device 144 incorporated therein.

Figure 5:
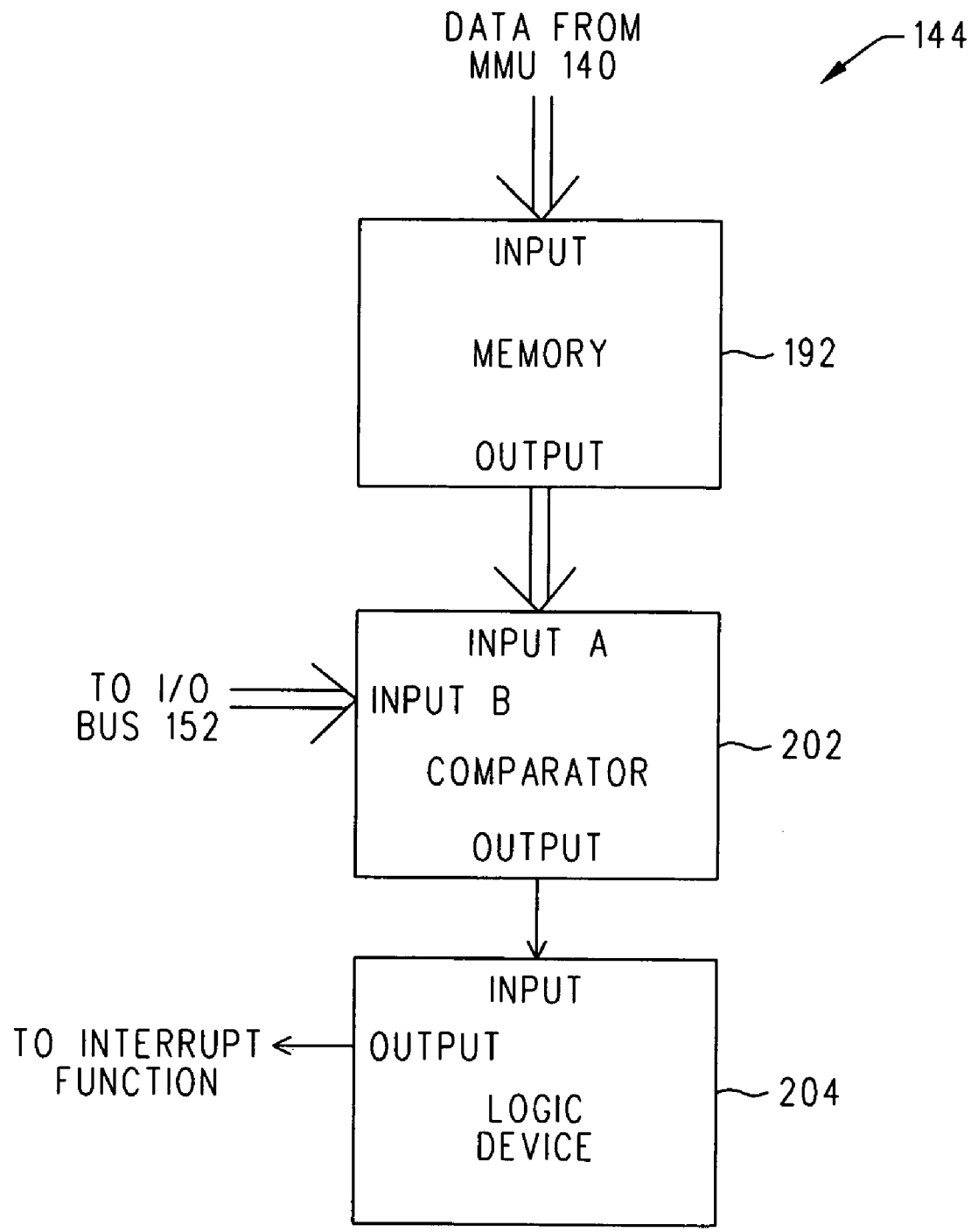
FIG. 5 is a block diagram of the monitoring device of FIG. 3.

The monitoring device 144 described herein assures that data stored in secured memory pages is not improperly transmitted via the I/O bus 152. A block diagram of the monitoring device 144 is shown in FIG. 5. The monitoring device 144 is described herein as being a printed circuit board or card that is connected to a motherboard of a computer via conventional connection devices, such as via an empty PCI slot. It should be noted that the monitoring device 144 may be connected to other systems within the computer so long as it has access to a bus. The non-limiting embodiment of the monitoring device 144 described herein has the memory portion 192 described above, a comparator 202, and a logic device 204.

The memory portion 192 may have an input and an output. The input may be connected to the MMU 140, as described in greater detail below. The output may be connected to the comparator 202 as is also described in greater detail below. As described above, in one embodiment of the monitoring device 144, the memory portion 192 is one of the memory pages 162, FIG. 3, that is assigned via the MMU 140. The memory portion 192 stores memory addresses that have been assigned a specific privilege level and that cause the monitoring device 144 to respond upon detection. Alternatively, the memory portion 192 may store specific memory addresses or a range of memory addresses that are to cause the monitoring device to respond regardless of their assigned privilege level. A response of the monitoring device 144 may include interrupting data or providing a notification to a user. These memory addresses are input into the memory portion 192 via the input.

In the embodiment of the monitoring device 144 described herein, the memory portion 192 stores at least one of the memory addresses that has been assigned a privilege level zero. The monitoring device 144 may then compare the stored memory addresses to the addresses present on the I/O bus 152. If a stored memory address matches an address present on the monitoring device 144 may respond by aborting data transfers associated with the memory address. It should be noted that in the embodiment described herein, the memory portion 192 of the monitoring device 144 is assigned a privilege level zero and, thus, may only be accessed via applications operating in the secure platform kernel 118. Accordingly, code operating at less secure privilege levels cannot determine or modify the memory addresses that are to be acted upon by the monitoring device 144.

The comparator 202 may have an input A, an input B, and an output. The input A may be operatively connected to the output of the memory portion 192. The input B may be operatively or otherwise electrically connected to the I/O bus 152 as shown in FIG. 3. In another embodiment, the input B may be connected to another bus within the computer system 100. The output of the comparator 202 may be operatively connected to an input of the logic device 204. The output of the comparator 202 may be in a first operative condition when the input A is equal to the input B, meaning that an address transmitted by way of the I/O bus 152 matches an address stored in the memory portion 192. The output of the comparator 202 may be in a second operative condition when the input A is not equal to the input B, meaning that an address transmitted by way of the I/O bus 152 does not match an address stored in the memory portion 192. The operative conditions of the output provide an indication as to whether a device is attempting to retrieve data stored in a secured or privileged memory location. The two operative conditions described above may be conventional digital logic levels.

The logic device 204 has the input that was briefly described above and an output. The input, as described above, is operatively connected to the output of the comparator 202. The output of the logic device 204 may serve to provide an indication as to whether the address on the I/O bus 152 matches at least one of the addresses stored in the memory portion 192. The output may also cause data transfers from the addresses stored in the memory portion 192 to be aborted. For example, when the output of the comparator 202 is in the first operative condition, the output of the logic device 204 may cause an interrupt or error signal to be transmitted via the I/O bus 152. This interrupt signal will abort data transfers and will assure that secure data is not improperly disseminated from secure memory locations.

The logic device 204 may also serve other functions. For example, the logic device 204 may additionally cause an indication to be provided to a user or to code or programs indicating that secured or privileged memory locations were attempted to be accessed. The logic device 204 may then restore the I/O bus 152 to its normal operation by removing any abort signals or the like that were used to stop the transfer of data from the secure memory locations. It should be noted that in one embodiment of the monitoring device 144, the logic device 204 is not present. Accordingly, the output of the comparator 202 may cause an error signal or the like to abort data transfers. In the embodiment of the monitoring device 144 described herein, the I/O bus 152 is a PCI bus and the output of the comparator 202 may abort data transfers by causing a signal to be transmitted by way of a parity error notification on the PCI bus.

Figure 6:
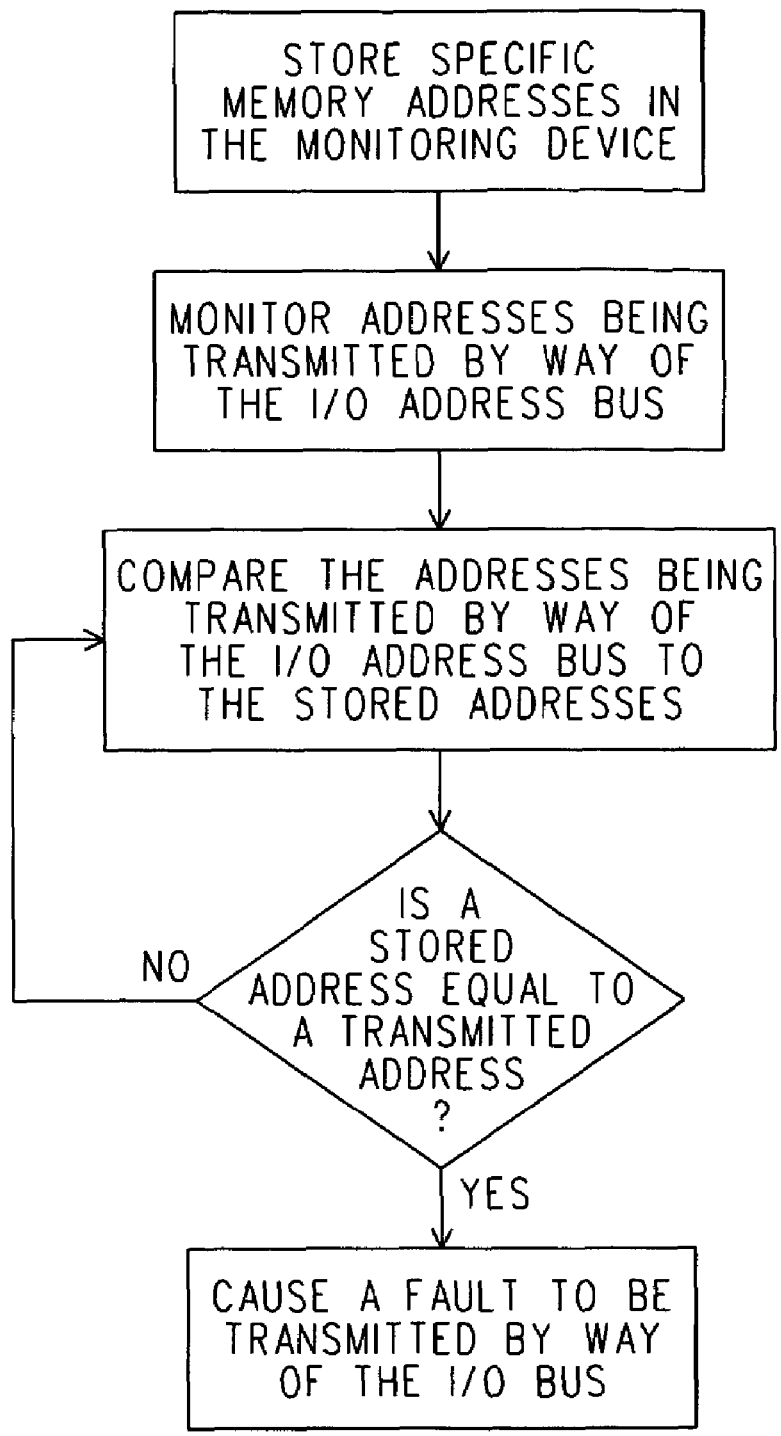
FIG. 6 is a flowchart illustrating the operation of the monitoring device of FIG. 5.

Having described the components of the monitoring device 144, the operation of the monitoring device 144 will now be described. Additional reference is made to FIG. 6, which is a flowchart that illustrates the operation of an embodiment of the monitoring device 144. Memory addresses that are to be acted upon by the monitoring device 144 are programmed or otherwise stored within the memory portion 192 of the monitoring device 144. For example, memory addresses or locations that have been assigned a specific privilege level by the MMU 140, FIG. 3, may be automatically stored in the memory portion 192 of the monitoring device 144. In one embodiment, memory locations that are secured or assigned to a privilege level zero are automatically stored within the memory portion 192. This automatic storing of specific memory locations automates the monitoring process. In another embodiment, memory locations may be manually input into the memory portion 192. For example, a user or a program may want to set aside specific memory locations and prevent data from these memory locations from being disseminated. This may be achieved by storing these memory locations in the memory portion 192 of the monitoring device 144.

The monitoring device 144 is connected to the I/O bus 152 of FIG. 3 and monitors memory addresses that are transmitted via the I/O bus 152. The addresses transmitted via the I/O bus 152 are compared to the addresses stored in the memory portion 192 by the comparator 202. When the addresses match, the output of the comparator 202 changes. For example, the output may change from a high state to a low state. When this state change occurs, the logic device 204 outputs a signal that interrupts or aborts data transfers associated with the address on the I/O bus 152. Accordingly, the data that is meant to be stored in secured locations is not able to be accessed or disseminated.

Having described some non-limiting embodiments of the computer system 100 including the monitoring device 144, other embodiments will now be described.

In one embodiment of the monitoring device 144, several memory addresses, or a ranges or memory addresses) are stored within the monitoring device 144. Storage and comparison of multiple memory addresses may be achieved by storing a plurality of memory addresses in the memory portion 192 of the monitoring device 144. As each memory address is transmitted by the I/O bus 152, the comparator 202 compares the addresses transmitted by way of the I/O bus 152 to addresses stored in the memory portion 192. The comparator may compare a plurality of addresses stored in the memory portion 192 to each address transmitted via the I/O bus 152. Accordingly, a single comparator may be used to monitor the I/O bus 152 for a plurality of addresses.

The plurality of addresses stored in the memory device 144 may comprise a range of addresses. The addresses may be programmed or otherwise established using a bit mask. Therefore, only the first few bits of an address transmitted via the bus may need to be compared to the stored address. In a similar embodiment, the comparator may determine if pages are odd or even. The addresses or range of addresses stored in the memory device 144 may be accessible solely via secured addresses.

In another embodiment of the computer system 100, FIG. 3, the I/O bus 152 or another bus transmits information pertaining to the identity of the device that is accessing the I/O bus 152. When the devices connected to the I/O bus 152 function as bus masters, the aforementioned identity may be the identity of the device acting as the bus master. For example, a binary code may be transmitted on the bus in conjunction with the memory address, wherein the binary code is representative of the device requesting access to the transmitted memory address. In this embodiment, the memory portion 192 may additionally contain data pertaining to the identity of devices that are authorized to access specific memory addresses, such as the secured memory addresses. A second comparator within the monitoring device 144 may then monitor the identity of the devices requesting access to the memory addresses to those devices that are authorized to access specific memory addresses. Accordingly, the aforementioned indication may be generated by the logic device 204 if a device attempts to access specific memory addresses and the device requesting the access to the specific memory addresses has not been authorized to do so.

In another embodiment of the monitoring device 144, the operation of the monitoring device 144 is performed by a computer. Accordingly, the computer replaces some or all of the above-described components. The computer has a computer readable medium and associated hardware that instructs the computer to monitor the I/O bus 152 as described above. The computer readable medium may, as not limiting examples, be random access memory or memory available within the computer, such as within a secured memory location. In addition, the computer may have conventional hardware components associated therewith that serve to interface with the I/O bus 152 and to provide a notification that the memory 138 is being improperly accessed.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A device for monitoring transactions on a bus, said device comprising:
    a memory component for storing at least one memory address corresponding to a security level of said computer;
    a first comparator component operatively connected to the memory component and the bus to compare an address transmitted over the bus with the at least one memory address for purposes of identifying whether said transmitted address is a secure memory location; and
    wherein the device causes a transaction associated with a secure memory location to be aborted.

2. The device of claim 1, wherein the address has a preselected number of bits and wherein the at least one memory address contains less than the preselected number of bits.

3. The device of claim 2, wherein the at least one memory address is an upper portion of an address transmitted by way of the bus; wherein the upper portion of the address represents a range of addresses.

4. The device of claim 1, wherein said secure memory location is associated with a predetermined privilege level.

5. The device of claim 1, wherein said bus is an input/output bus.

6. The device of claim 1, wherein said bus comprises a peripheral component interconnect bus.

7. The device of claim 1, wherein said bus comprises a small computer system interface bus.

8. The device of claim 1, wherein said first comparator is operatively associated with a parity error notification of said bus.

9. The device of claim 1, wherein said at least one memory address is storable in said memory device is programable within said memory device.

10. A method of managing memory in a computer system, wherein the computer system comprises a master device and a slave device coupled to a bus, the method comprising:
    receiving a request associated with the master device for an allocation of memory;
    providing a memory allocation in response to the request;
    configuring a bus monitor according to the allocated memory, a portion of the memory being designated as secured memory locations and a portion being designated as unsecured memory locations;
    monitoring the bus for transactions between the master device and the slave device corresponding to the secured memory locations; and
    aborting transactions associated with the secured memory locations.

11. A device for monitoring a bus within a computer, said computer comprising a plurality of security levels, said device comprising:
    a memory device, wherein at least one address associated with said bus is storable in said memory device, said at least one address corresponding to a first security level of said plurality of security levels; and
    a first comparator operatively connected to said memory device and said bus, wherein said at least one address storable in said memory device is comparable to an address transmitted by way of said bus using said comparator;
    said first comparator having a first operative mode when an address transmitted by said bus corresponds to said first security level; and
    said first comparator having a second operative mode when an address transmitted by said bus corresponds to a second security level.

12. The device of claim 11, wherein data representative of the identity of a device is transmittable along with said address and wherein the identity of at least one device is storable in said memory device, and further comprising a second comparator, said second comparator being operatively connected to said memory device and said bus, said second comparator having a first operative mode when the identity of a device transmitted by way of said bus is equal to said identity of a device storable in said memory device, and said second comparator having a second operative mode when the identity of a device transmitted by way of said bus is not equal to said identity of a device storable in said memory device.

13. The device of claim 11, wherein said at least one address storable in said memory device is programable within said memory device.

14. The device of claim 11, wherein said address storable in said memory device is programable by way of one of said first security level.

15. The device of claim 14, wherein said first security level is the most privileged level of security.

16. A device for monitoring a bus, said device comprising:
a processor operatively connected to said bus, said processor being associated with a computer readable medium, said computer readable medium comprising instruction for:
receiving a request associated with the master device for an allocation of memory;
providing a memory allocation in response to the request;
configuring a bus monitor according to the allocated memory, a portion of the memory being designated as secured and a portion being designated as unsecured;
monitoring the bus for transactions between the master device and the slave device corresponding to the secured memory; and
aborting transactions associated with the secured memory.

17. A method for monitoring a bus associated with a computer, said method comprising:
storing a plurality of addresses, said plurality of addresses address corresponding to security levels of said computer;
monitoring addresses transmitted by way of said bus using a monitoring device;
comparing said addresses transmitted by way of said bus to said plurality of stored addresses; and
providing an indication if at least one of said addresses transmitted by way of said bus is the same as at least one of said plurality of stored addresses.

18. The method of claim 17 wherein said addresses transmitted by way said bus are associated with data transmitted by way of said bus, and wherein said providing an indication further comprises interrupting the transfer of data.

19. The method of claim 17, wherein the identity of a device operatively connected to said bus is transmittable on said bus, and method further comprising:
storing the identity of at least one device that is operatively connectable to said bus;
comparing the identity of at least one device that is transmitted with said addresses to the stored identity of said at least one device operatively connectable to said bus; and
providing an indication if the identity of said at least one device that is transmitted by way of said bus is the same of said stored identity of said at least one device operatively connected to said bus.

20. The method of claim 17, wherein said plurality of addresses correspond to a most privileged level of security associated with said computer.

21. The method of claim 17, wherein said plurality of addresses correspond to a least privileged level of security associated with said computer.

22. A bus monitoring device comprising:
monitoring means for monitoring addresses transmitted by way of said bus;
storage means for storing at least one address, said at least one address corresponding to a memory address that corresponds to one of a plurality of security levels of said computer;
comparing means for comparing said addresses transmitted by way of said bus to the at least one stored address; and
notification means for providing a notification if an address transmitted by way of said bus is the same as said at east one stored address.

* * * * *

UNITED STATES PATENT AND TRADEMARK OFFICE
CERTIFICATE OF CORRECTION

| | |
|---|---|
| PATENT NO. | : 7,246,213 B2 |
| APPLICATION NO. | : 10/902406 |
| DATED | : July 17, 2007 |
| INVENTOR(S) | : Robert D. Gardner |

It is certified that error appears in the above-identified patent and that said Letters Patent is hereby corrected as shown below:

In column 1, line 34, delete "modem" and insert -- modern --, therefor.

In column 12, line 2, in Claim 18, after "way" insert -- of --.

In column 12, line 36, in Claim 22, delete "at east" and insert -- at least --, therefor.

Signed and Sealed this

Thirteenth Day of January, 2009

JON W. DUDAS
*Director of the United States Patent and Trademark Office*